(12) United States Patent
Ertlmeier et al.

(10) Patent No.: US 12,304,346 B2
(45) Date of Patent: May 20, 2025

(54) DEVICE AND METHOD FOR INCREASING THE RANGE OF AN ELECTRIC VEHICLE (71) Applicant: Bayerische Motoren Werke Aktiengesellschaft, Munich (DE)

(72) Inventors: Andreas Ertlmeier, Wolnzach (DE); Julian Wiesmeier, Deisenhofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 205 days.

(21) Appl. No.: 17/921,664

(22) PCT Filed: Jul. 6, 2021

(86) PCT No.: PCT/EP2021/068580
§ 371 (c)(1),
(2) Date: Oct. 27, 2022

(87) PCT Pub. No.: WO2022/017767
PCT Pub. Date: Jan. 27, 2022

(65) Prior Publication Data
US 2023/0173944 A1  Jun. 8, 2023

(30) Foreign Application Priority Data

Jul. 22, 2020 (DE) .................... 10 2020 119 346.7

(51) Int. Cl.
*B60L 58/12* (2019.01)
*B60L 50/60* (2019.01)
(Continued)

(52) U.S. Cl.
CPC ............ *B60L 58/13* (2019.02); *G01D 7/00* (2013.01)

(58) Field of Classification Search
CPC .................... B60L 58/13; G01D 7/00
See application file for complete search history.

(56) References Cited

U.S. PATENT DOCUMENTS

2012/0283903 A1* 11/2012 Kusumi ............... B60L 3/12
701/22
2013/0221741 A1* 8/2013 Stanek ............... B60L 58/13
903/903
(Continued)

FOREIGN PATENT DOCUMENTS

DE  10 2013 202 725 A1  8/2013
DE  10 2015 203 491 A1  9/2016
DE  10 2017 202 650 A1  10/2018

OTHER PUBLICATIONS

International Search Report (PCT/ISA/210) issued in PCT Application No. PCT/EP2021/068580 dated Oct. 20, 2021 with English translation (six (6) pages).
(Continued)

*Primary Examiner* — Jess Whittington
*Assistant Examiner* — Rami Nabih Bedewi
(74) *Attorney, Agent, or Firm* — Crowell & Moring LLP (57) ABSTRACT

A device and method for increasing the range of an electric vehicle. A control unit estimates a remaining range of the high-voltage battery based on a state-of-charge of the high-voltage battery. The remaining range is displayed on a display. If the control unit determines, during driving in the normal mode, that the remaining range results from an estimation error that over-estimates the remaining range, then without correcting the remaining range displayed, the control unit automatically switches the electric vehicle from a normal mode to an emergency mode in which a cell voltage below a first cell voltage limit is useable by the electric motor. The cell voltage below the first cell voltage limit is not useable by the electric vehicle in the normal mode. The first cell voltage limit is associated with a lower state-of-charge limit at which the remaining range is displayed as a no-remaining-range indicator.

18 Claims, 6 Drawing Sheets

(51) Int. Cl.
*B60L 58/13* (2019.01)
*B60L 58/18* (2019.01)
*B60L 58/19* (2019.01)
*B60L 58/21* (2019.01)
*B60L 58/22* (2019.01)
*G01D 7/00* (2006.01)

(56) References Cited

U.S. PATENT DOCUMENTS

| | | | |
|---|---|---|---|
| 2016/0250944 A1* | 9/2016 | Christ | B60L 58/15 |
| | | | 701/22 |
| 2018/0079303 A1* | 3/2018 | Gromotka | B60K 35/00 |
| 2018/0264967 A1* | 9/2018 | Damjanovic | B60W 10/08 |

OTHER PUBLICATIONS

German-language Written Opinion (PCT/ISA/237) issued in PCT Application No. PCT/EP2021/068580 dated Oct. 20, 2021 (nine (9) pages).
German-language Search Report issued in German Application No. 10 2020 119 346.7 dated Jun. 22, 2021 with partial English translation (10 pages).

* cited by examiner

DEVICE AND METHOD FOR INCREASING THE RANGE OF AN ELECTRIC VEHICLE

BACKGROUND AND SUMMARY

The invention relates to a device and a corresponding method for increasing the range of an electric vehicle.

Vehicles having an electric drive (i.e., having an electric motor, which is used for driving the vehicle) typically include an energy accumulator (also referred to as a high-voltage battery or a traction battery), which is configured for storing electrical energy for operating the electric motor. The electrical energy for driving the vehicle (also referred to as traction energy) is typically electrochemically stored in the energy accumulator. Exemplary energy accumulators include a plurality of lithium ion-based storage cells.

The electrical energy accumulator has a limited capacity for storing traction energy. The range of a vehicle that is currently achievable with the limited capacity is relatively small in comparison to the range that can be achieved with a vehicle having an internal combustion engine. In addition, the number of public charging stations for electric vehicles is relatively limited at this time. Therefore, with respect to an electric vehicle, there is an increased risk that the electric vehicle cannot reach a desired destination with the available electrical energy and the electric vehicle may need to be towed.

For example, DE 10 2015 203 491 A1 deals with the technical problem of efficiently reducing the risk that an electric vehicle will not have sufficient electrical energy to reach a desired destination. In particular, a driver of an electric vehicle is to be efficiently enabled to increase the range of the electric vehicle, if necessary.

According to this document, a method for increasing the range of a vehicle is described, wherein the method includes the step of ascertaining that a fill level reserve of an energy accumulator of the vehicle is to be used for operating the electric motor.

The energy accumulator is configured for storing electrical energy, wherein the amount of electrical energy in the energy accumulator is typically indicated by a fill level (also referred to as state of charge, SOC) of the energy accumulator. The energy accumulator is mostly operated in a standard operating mode in which the energy accumulator is not completely charged and/or not completely discharged, in order to achieve the longest possible service life of the energy accumulator (i.e., the highest possible number of storage cycles). The energy accumulator can, for example, in the standard operating mode, discharge up to a minimally permissible fill level (also referred to below as a lower charge state limit) (wherein the minimally permissible fill level is greater than 0%) and/or charge up to a maximally permissible fill level (wherein the maximally permissible fill level is less than 100%). In other words, the energy accumulator can be operated in the standard operating mode in a basically permissible fill level range intended for the energy accumulator. The intended fill level range can be limited in the downward direction by the minimally permissible fill level and/or in the upward direction by the maximally permissible fill level.

The fill level reserve is outside the fill level range intended for the energy accumulator. The fill level reserve can include, for example, a lower fill level reserve in which a fill level of the energy accumulator is below the minimally permissible fill level (possibly down to a minimally possible fill level of, for example, 0%). Alternatively or additionally, the fill level reserve can include an upper fill level reserve in which the fill level of the energy accumulator is above the maximally possible fill level (possibly up to a maximally possible fill level of, for example, 100%).

Typically, during the operation of the energy accumulator within the intended fill level range, a service life of the energy accumulator is reduced statistically less than during the operation of the energy accumulator within the fill level reserve. It is therefore usually advantageous (for the service life of the energy accumulator) to operate the energy accumulator by default in the standard operating mode, i.e., within the intended fill level range. The fill level reserve of the energy accumulator should, on the other hand, be used only in exceptional cases, since a utilization of the fill level reserve of the energy accumulator typically statistically results in a reduction of the service life of the energy accumulator (in comparison to an exclusive utilization in the intended fill level range).

The method therefore includes the step of ascertaining that (as an exception) the fill level reserve of the energy accumulator is to be used for operating the electric motor of the vehicle. This operating mode of the energy accumulator can be referred to as a capacity-increasing operating mode of the energy accumulator. It can therefore be ascertained that the capacity-increasing operating mode of the energy accumulator is to be activated. In the capacity-increasing operating mode, not only the intended fill level range, but also the fill level reserve of the energy accumulator are used to operate the electric motor to drive the vehicle.

The method also includes the step, in response to the ascertainment that the capacity-increasing operating mode is to be activated, of using electrical energy from the fill level reserve of the energy accumulator to operate the electric motor of the vehicle (i.e., to drive the vehicle). The utilization of the fill level reserve of the energy accumulator can be limited to a predefined number of charge cycles of the energy accumulator (for example, to a single charge cycle). This means, the method can also include the step of limiting the utilization of the fill level reserve of the energy accumulator to a predefined, limited number of charge cycles. After the limited number of charge cycles, the energy accumulator can automatically transition from the capacity-increasing operating mode into the standard operating mode.

The capacity-increasing operating mode is permitted, according to this prior art, to be activated basically only due to an explicit demand or input from a user. The ascertainment that the fill level reserve of the energy accumulator is to be used therefore includes the step of detecting the input from a user of the vehicle via an input/output unit of the vehicle. Due to the requirement of an explicit input from a user of the vehicle and due to the optional coupling of the utilization of the fill level reserve of the energy accumulator to one or multiple conditions, the damage of the energy accumulator due to an excessive utilization of the fill level reserve can be limited. Moreover, the utilization of the fill level reserve can be offered to a user as a value-added feature of the vehicle (possibly in exchange for payment).

The method can also include the step of activating one or multiple measures, by means of which a consumption of electrical energy by the vehicle is reduced while electrical energy from the fill level reserve is used for operating the electric motor. It can be assumed that, when a user activates the capacity-increasing operating mode of the energy accumulator, the user of the vehicle would like to maximize the range of the vehicle. It can therefore be advantageous that, if necessary, one or multiple consumption-reducing measure(s) (for example, the deactivation of an air conditioning system and/or the limitation of a driving speed of the vehicle) can be automatically carried out when the capacity-increasing operating mode of the energy accumulator has been activated. In this way, the range of the vehicle can be further increased.

The lower fill level reserve can be provided during a trip of the vehicle in order to increase the range of the vehicle (for example, in order to reach a destination). In particular, it can be ascertained during the trip of the vehicle that the lower fill level reserve is to be utilized. Therefore, a so-called "LIMP HOME" function, which is also referred to as "turtle mode," can be provided for the vehicle. In this system, which is described in DE 10 2015 203 491 A1, therefore, with a so-called "LIMP HOME" function, a fill level reserve of a high-voltage battery is provided only if manually requested by the driver. If the fill level reserve is released, no range, i.e., for example, "0 km" or "---," is displayed to the driver.

The problem addressed by the invention is to increase the range of an electric vehicle without bothering the driver with necessary manual interventions.

This problem is solved by the features of the independent patent claims. Advantageous refinements of the invention are the subject matter of the dependent patent claims.

The invention relates to a device and a method for increasing the range of a vehicle which is driven by an electric motor and a high-voltage battery, including an electronic control unit which is programmed in particular such that:
- on the basis of the high-voltage battery state of charge, which is continuously estimated in an updated manner, a corresponding remaining range is displayed to the driver,
- a lower charge state limit is defined, which is associated with a remaining range to be displayed of zero when the state of charge is estimated in an error-free manner,
- the lower charge state limit is associated with a defined first minimally permissible cell voltage limit,
- during a driving operation, a check is carried out to determine whether a greater range is being displayed than what can be demanded on the basis of the current state of charge due to an estimation error,
- the display is not (abruptly) corrected (in order not to irritate the driver) by the estimation error difference, and
- an emergency mode is automatically activated if an estimation error has been detected, wherein a reduction of the cell voltage below the first cell voltage limit is permitted in the emergency mode.

Preferably, the cell voltage is reduced in the emergency mode such that the displayed remaining range is actually achievable. However, the reduced cell voltage is permitted only temporarily, for example, up to the next charging process or until a reduced second cell voltage limit has been reached.

The invention includes the following advantageous refinements:
The emergency mode is preferably predefined in a charge state range directly below a defined estimation reserve.
The defined estimation reserve is predefined directly below the lower charge state limit.
The emergency mode is suppressible if defined conditions are present, wherein one condition for suppressing the emergency mode can be, for example, that the second cell voltage limit or an aging limit has been fallen below.

In a driving operation with a suppressed emergency mode, the lower charge state limit can be set higher than in a driving operation with a permitted emergency mode.
In a driving operation with a suppressed emergency mode, additionally or alternatively, the charge state range of the estimation reserve can be greater than in a driving operation with a permitted emergency mode.

The invention is based on the following considerations.

Within the scope of the development of SOC (state of charge) algorithms and in designing the usable energy content within the scope of the development of high-voltage batteries for electric vehicles, efforts are continually made, first, to reduce the estimation reserve in order to be able to provide the vehicle with a greater usable range and, second, to reduce or at least not increase the number of cases in which a remaining range of 0 km is displayed, although an even greater remaining range actually exists ("a vehicle with remaining range that needs to be towed").

In every electric vehicle, the state of charge of the battery is merely estimated, since an actual measurement is technically not possible. With respect to electrically operated vehicles, it is always to be ensured that the driver does not "break down" due to a battery actually being dead despite a displayed remaining range. In order to ensure this, algorithms are used that estimate the state of charge as accurately as possible. Since this estimation has only a finite accuracy, a so-called "estimation reserve" is defined, which, in the normal case, is not made available as a range and, thereby, basically reduces the usable energy and the electric range.

Despite a high estimation reserve, it cannot be ruled out in all cases that a vehicle with remaining range will need to be towed. A compromise must always be struck between reducing the risk of needing to be towed and optimizing the electric range.

If it is recognized that an estimation error is present in the sense that a greater range or power is being displayed to the driver than what can be demanded due to the available state of charge (for example, corresponding to a constant speed of 80 km/h), then, according to the invention, an emergency mode preferably in addition to the estimation reserve is activated to ensure the remaining range ("ReSi" mode). In this emergency mode, the regular cell voltage limits are temporarily lowered, in order to release energy that is not usable in the normal case. The operating range of the battery is, for all intents and purposes, temporarily expanded even more than in the case of an estimation reserve.

The cell voltage limit may not be continuously lowered, due to reasons related to aging, since the cells in this low voltage range age to a comparatively great extent. Since this emergency mode only rarely occurs (SOC estimation error AND the driver makes full use of his/her displayed range), however, a lowering of the cell voltage limit can be accepted in these temporarily occurring cases.

According to the invention, a comparatively low estimation reserve can also be defined with the estimation error-dependent emergency mode. A continuously increased range is therefore also obtained.

Method-Related Exemplary Embodiment

If an estimation error is detected by an electronic control unit necessary for implementing the invention, in particular due to the fact that the cell voltages of the individual cells of the high-voltage battery are already at the cell voltage limit of the standard operating mode (for example, 2.8V), the range in the standard operating mode approaches 0 km under consideration of the estimated state of charge (SOC), and a range greater than 0 km is nevertheless being displayed to the driver, however, then, according to the invention, the emergency mode is automatically activated. For this purpose, the cell voltage limit is lowered (for example, from 2.8V (normal operation) to 2.1V) in order to release energy reserves. In principle, a voltage monitoring of all battery cells is necessary for this purpose.

If the vehicle is charged, the emergency mode is cancelled.

The estimation reserve (which is usually based on an estimation error of 5%) can be reduced for all vehicles, since the emergency mode according to the invention now exists for the few "critical" cases in order to avoid the case in which vehicles with remaining range need to be towed.

The manually triggerable fill level reserve from the prior art is therefore, according to the invention, replaced in two steps by the (preferably reduced) estimation reserve and the emergency mode, which is automatically triggered depending on the detection of the estimation error.

The invention is described in greater detail in the following on the basis of exemplary embodiments.

DETAILED DESCRIPTION OF THE DRAWINGS

Figure 1:
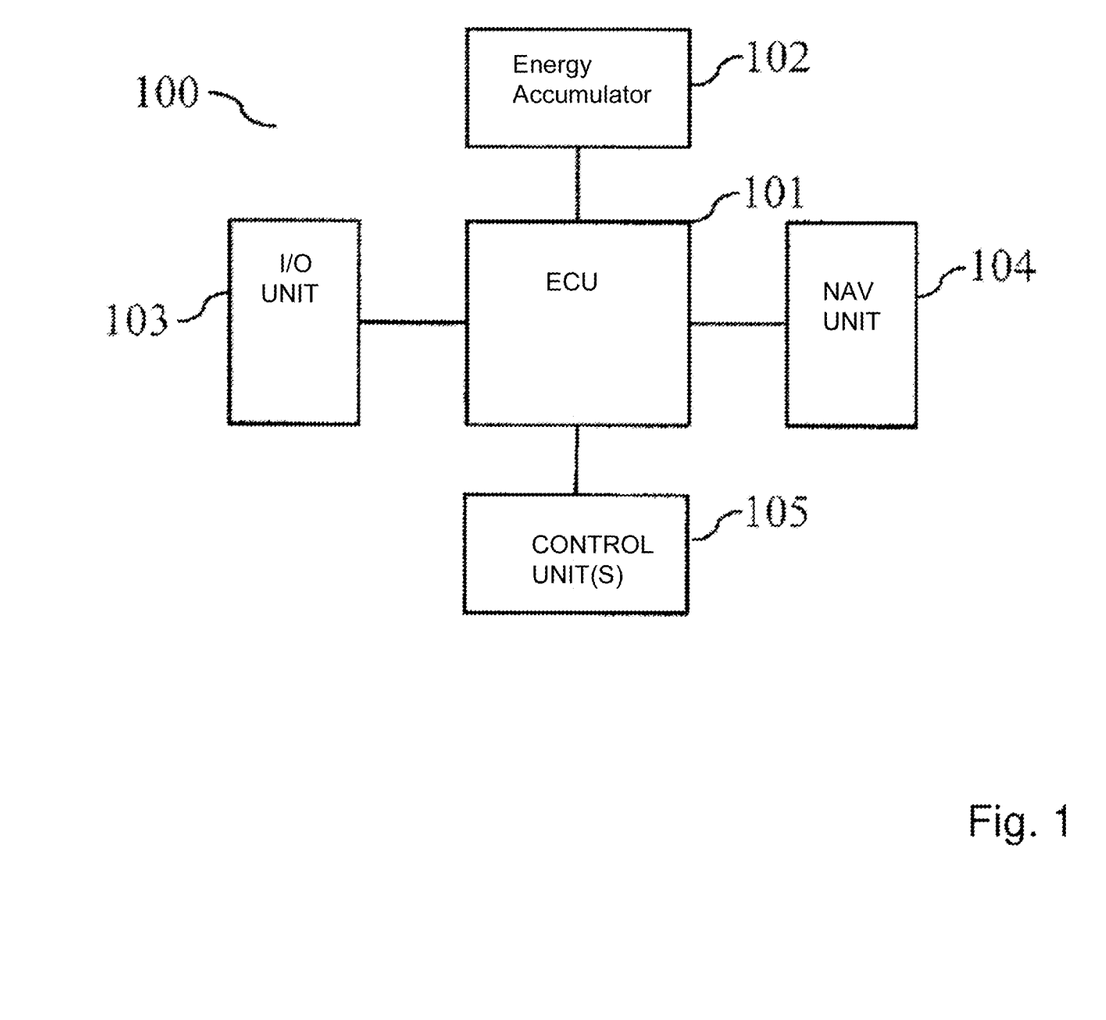
FIG. 1 is a schematic representation of possible components of an electric vehicle having the emergency mode according to an embodiment of the invention.

FIG. 1 shows a block diagram with exemplary components of an electric vehicle 100. In particular, the vehicle 100 includes an energy accumulator 102 (in particular a high-voltage battery), which is configured for providing electrical energy for operating an electric motor of the vehicle 100. The energy accumulator 102 is configured for ascertaining its fill level (also referred to as state of charge, SOC) and providing the fill level to an electronic control unit 101. The control unit 101 can be configured for ascertaining a remaining range of the vehicle 100 on the basis of the fill level (SOC) of the energy accumulator 102. Alternatively, however, the control unit 101 itself can also ascertain, in particular estimate, the state of charge and the resultant remaining range depending on signals of the energy accumulator 102.

The vehicle 100 can also include a navigation unit 104, which is configured for ascertaining a position of the vehicle 100 and/or a planned travel route for the vehicle 100. The control unit 101 can be configured for ascertaining whether the vehicle 100 can cover the planned travel route in light of the remaining range.

In order to increase the service life of an energy accumulator 102 (in particular of an electrochemical energy accumulator, such as, for example, a lithium ion-based energy accumulator), an energy accumulator 102 is typically operated in a fill level range, by means of which the effectively available capacity of the energy accumulator 102 is reduced in comparison to a maximum capacity of the energy accumulator 102 (standard operating mode). In the standard operating mode, in particular, a lower charge state limit is not fallen below, in principle.

Moreover, an input/output unit 103 of the vehicle 100 can be provided for detecting an input by the user of the vehicle 100.

Moreover, the control unit 101 can be configured for prompting one or multiple control unit(s) 105 of the vehicle 100 to switch to an energy-saving mode if it has been detected that the minimum SOC value of the standard operating mode has been reached. For example, an air conditioning system of the vehicle 100 can be deactivated and/or a driving speed and/or an acceleration of the vehicle 100 can be limited. In other words, the control unit 101 can be configured for taking measures to reduce an energy consumption of the vehicle 100 in order to further increase the range of the vehicle 100.

These components are basically the prior art. An essential integral part of the invention is the electronic control unit 101, which is appropriately programmed (computer program product in control units), in particular, for carrying out the emergency mode according to the invention.

Figure 2:
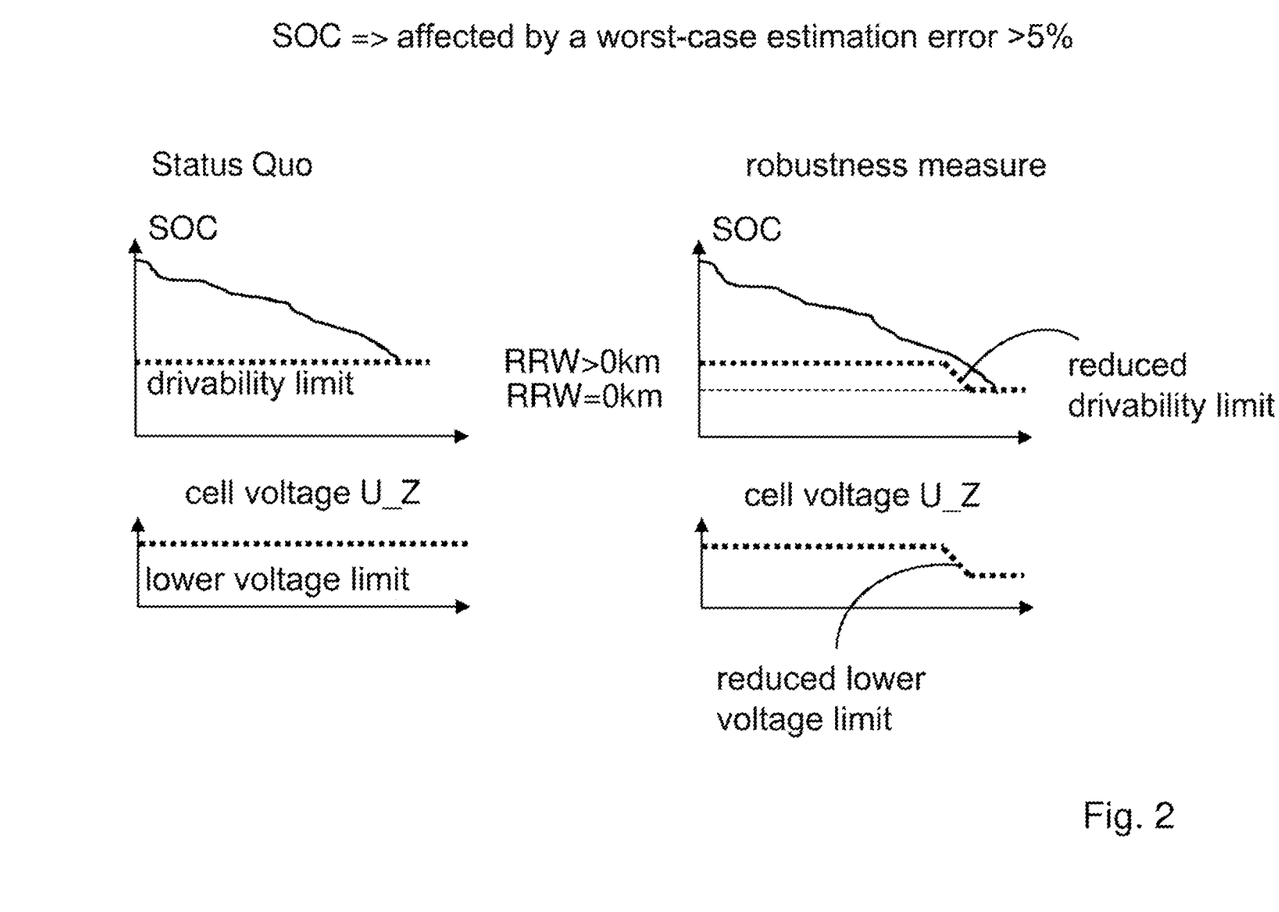
FIG. 2 shows a first aspect of the invention for ensuring a remaining range given an SOC estimation error that is greater than the established estimation reserve, in comparison to the status quo.

A first aspect of the invention is explained with reference to FIG. 2 and with reference to a first situation:

FIG. 2, Left: Prior Art (Status Quo)
- Situation 1: The drivability limit (=lower SOC value of an estimation reserve) is reached, but a remaining range RRW>0 km is displayed to the driver, since a maximum estimation error of only 5% was assumed during the establishment of the estimation reserve, the maximum estimation error of only 5% having actually been exceeded here, however.
- A defined (first) lower cell voltage limit is reached (the cell voltage limit is not lowered).
  - The SOC estimation error can also be >5% in extremely rare "worst case" scenarios (in particular after aging).
  - In this case, a "need to get the vehicle towed" can arise at a displayed remaining range greater than 0 km if the driver drives his/her vehicle until completely "empty".

FIG. 2, Right: Invention ("Robustness Measure")
- Given the same situation 1 above:
- The drivability limit is reduced in an emergency mode such that a displayed range of 0 km is reached; i.e., the driver can drive electrically until "0 km" or "---" is displayed.
- For this purpose, preferably or if necessary, the lower cell voltage limit is lowered to such an extent that the energy reserve necessary for the emergency mode is temporarily made available.
  - If, in the above-described situation 1, the power therefore drops below a defined drivable level (for example, only a constant speed of 80 km/h is possible) at an energy forecast of >0 kWh, then, according to the invention, an estimation error is detected and the lower cell voltage level is temporarily lowered.
  - In the ideal case, the driver can still "escape" to the charging station, but, at the least, he/she can continue driving until "---" (RRW=0 km) is displayed.
  - A temporary lowering of the lower cell voltage limit (for example, from 2.8V to 2.1V) only in the special case (i.e., at a low state of charge (SOC) with a remaining range of greater than 0 km due to a detected high estimation error) is non-critical due to the findings made by the inventors in tests with respect to the aging of the cells.

The lowered cell voltage limit (for example, 2.1V) is preferably to still be above a limit necessary for functional reliability (for example, 1.7V), however.

Figure 3:
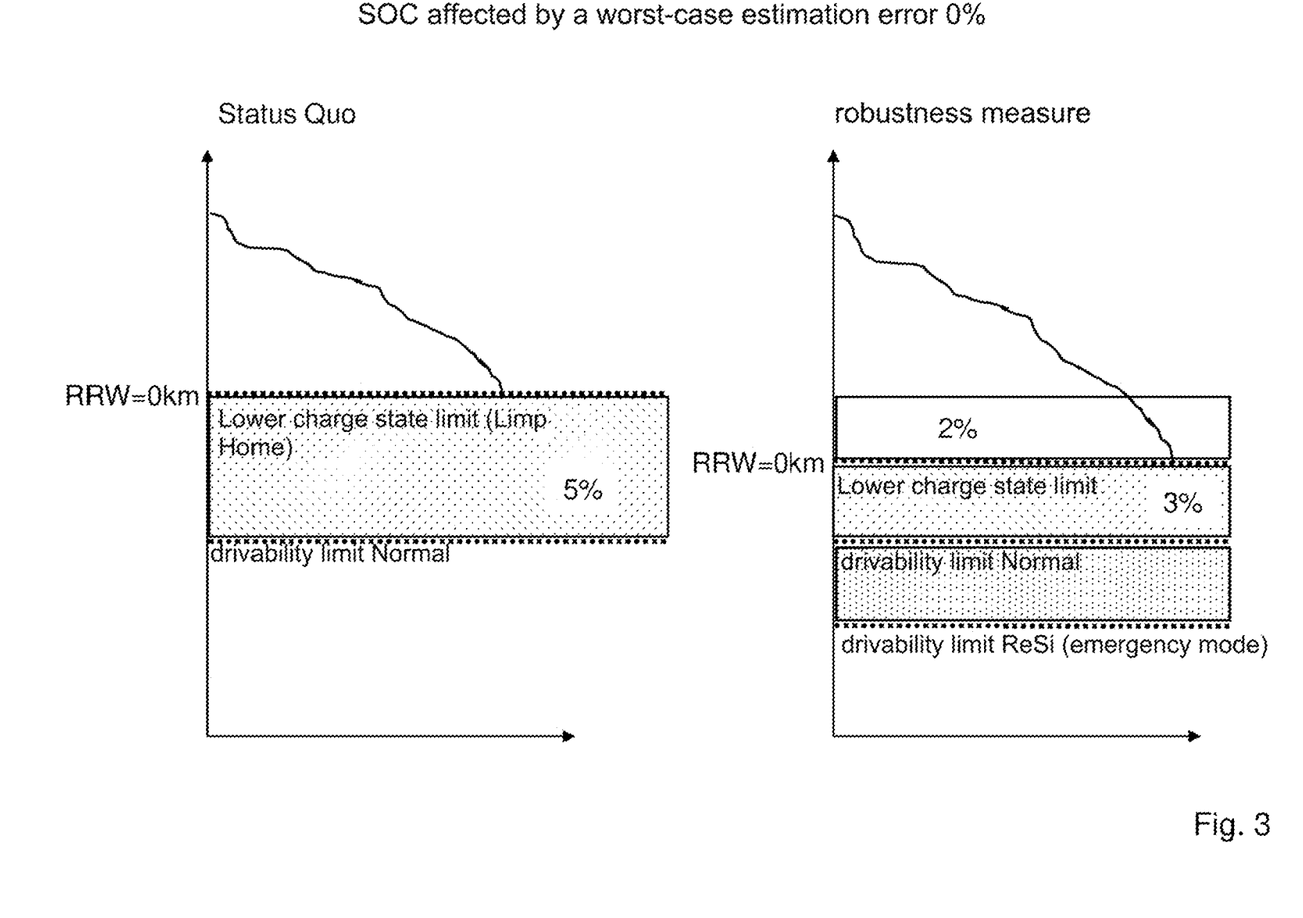
FIG. 3 shows a second aspect of the invention for ensuring a remaining range with a reduced SOC estimation reserve, but given an SOC estimation error of zero, in comparison to the status quo.

A second aspect of the invention is explained with reference to FIG. 3:

FIG. 3, Left: Prior Art (Status Quo)

Situation 2: The lower charge state limit of the standard operating mode is relatively high; if this is fallen below, the result is an early utilization of the estimation reserve in the sense of a fill level reserve.

Reduction to "normal" also relatively high drivability limit as the lower limit of the estimation reserve (limp home range, so-called "turtle mode"): 5% estimation reserve is not displayed to the user as a usable range and is usable as an estimation reserve only in the "turtle mode".

An SOC estimation reserve of 5% is taken into account in the energy configuration.

In a very large number of use cases, the actually possible range is not released, since a reserve must be retained for the special case of "high estimation error."

FIG. 3, Right: Invention ("Robustness Measure")

Given the same situation 2 above:

A portion of the estimation reserve according to the status quo (for example, 2%) is displayed to the driver here as a usable range.

The "Normal" drivability limit is lowered: "ReSi" (=ensuring the remaining range=emergency mode) drivability limit: Given an estimation error of >3% in the low SOC range, the emergency mode is activated.

In the energy configuration, the estimation reserve can be reduced according to the invention (for example, from 5% to 3%). The estimation error is not changed due to the emergency mode.

In the case of "estimation error and displayed remaining range", which now occurs more frequently, the emergency mode (ReSi) is activated and, for this purpose, the cell voltage limit is lowered. The consequence is, at least, no increase of the risk of the "vehicle needing to be towed" in comparison to the prior art.

Figure 4:
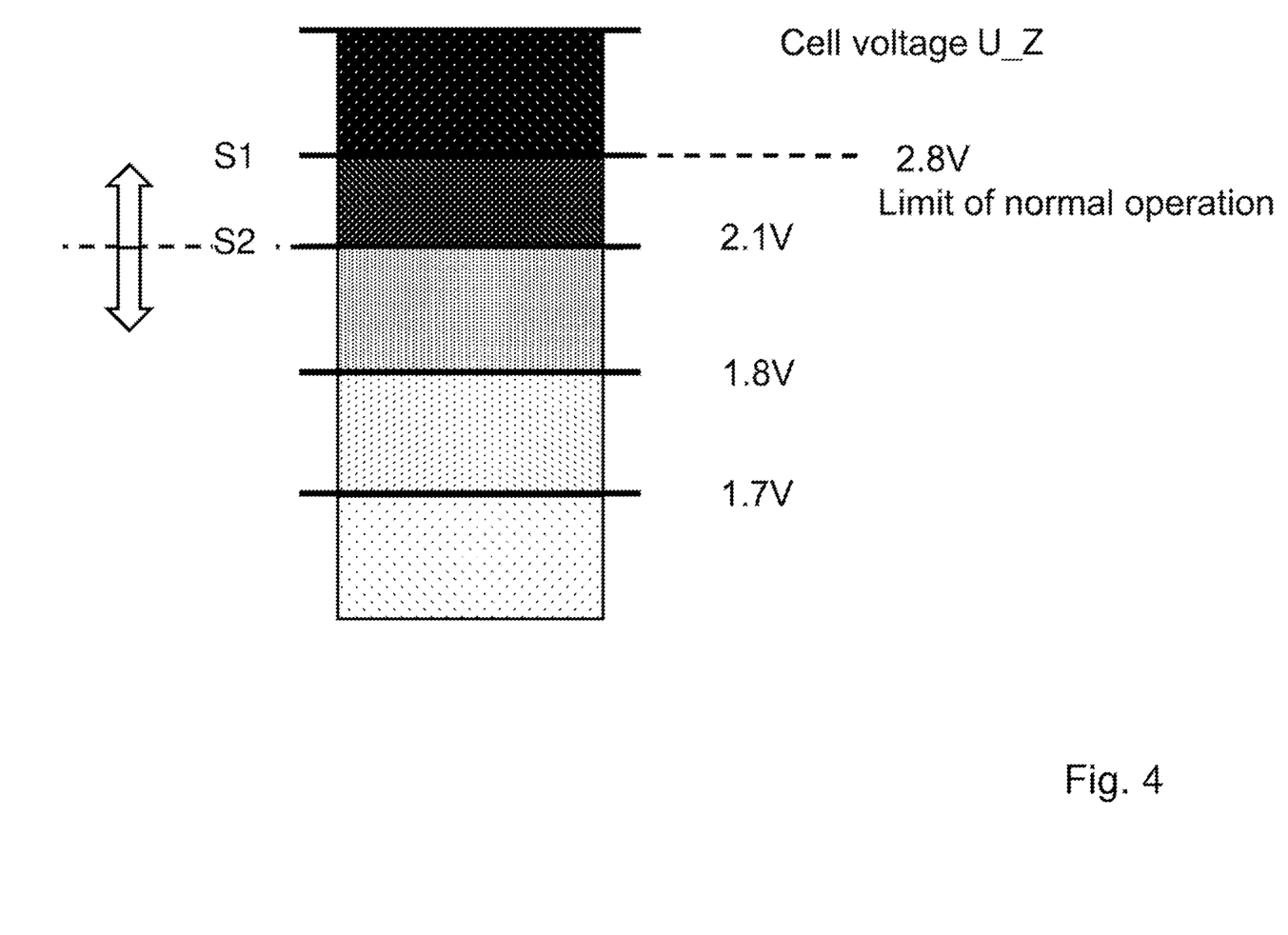
FIG. 4 shows various defined voltage thresholds for a cell.

FIG. 4 shows various defined voltage thresholds for a cell. According to the invention, it can be defined in the electronic control unit 101 that the estimation reserve is selected up to the point of a first lower voltage threshold S1 (for example, 2.8V) being fallen below. If the emergency mode is activated, the cell voltage limit can be lowered to a lower second threshold value S2 (for example, 2.1V), which can also be variably predefined depending on parameters such as temperature and aging.

Figure 5:
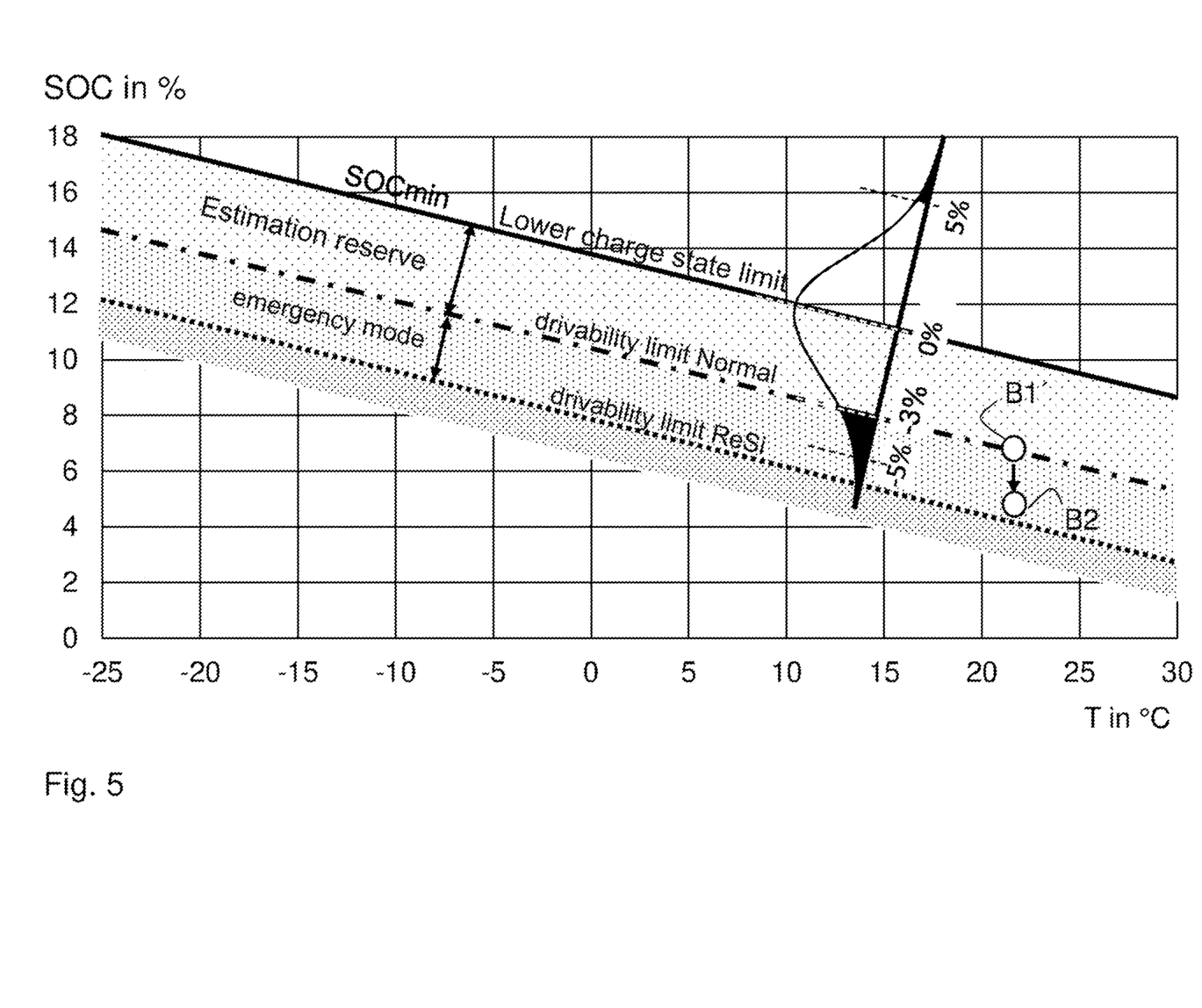
FIG. 5 shows the emergency mode with a simultaneously reduced estimation reserve.
Figure 6:
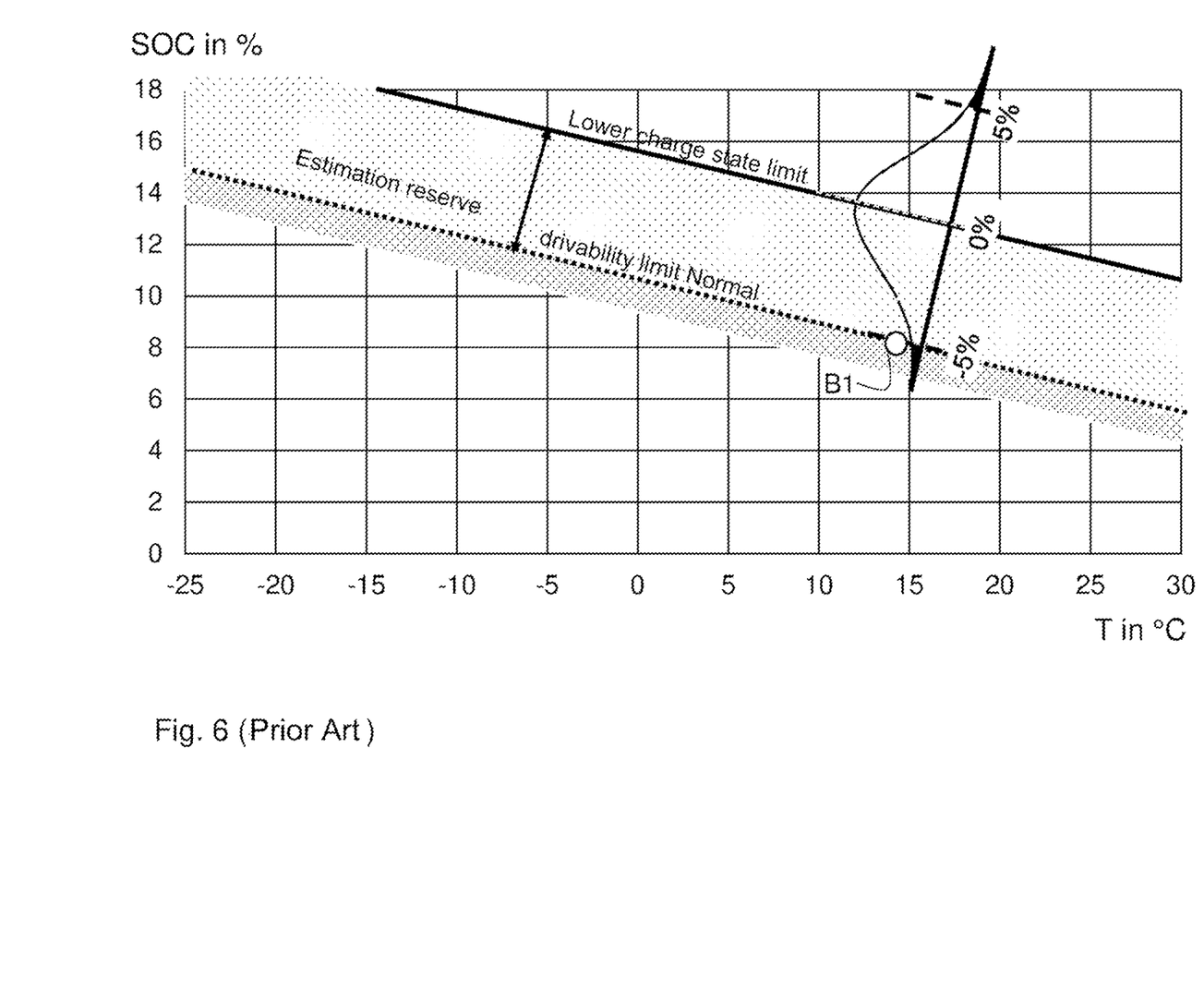
FIG. 6 shows the estimation reserve according to the prior art.

In FIG. 5, the invention is represented once again in another way in contrast to the prior art according to FIG. 6. FIG. 6 corresponds to the left side (status quo) of FIG. 2. FIG. 5 corresponds to the right side (robustness measure) of FIG. 3.

In FIGS. 5 and 6, the Gaussian curves of an estimation error are plotted with respect to the establishment of the lower charge state limits and the drivability limits.

In FIG. 6 (according to the prior art), a comparatively high lower charge state limit and a drivability limit (normal) are defined for a −5% estimation reserve.

Example at the operating point B1 given an estimation reserve of 5%: The state of charge SOC is incorrectly estimated here, since an estimation error >5% has occurred. The display could then, for example, erroneously still display a remaining range (RRW) of 6 km. The vehicle could come to a stop, however, at a displayed remaining range (RRW) of 4 km if the driver continues driving. An abrupt correction of 6 km to 4 km is to be prevented for reliability reasons.

In FIG. 5, an operating point B1' is plotted as an example at an estimation reserve of 3% that is reduced in comparison to the prior art (the estimation reserve could also remain at 5%, but the invention enables a reduced estimation reserve): The state of charge SOC is incorrectly estimated, since an estimation error >3% arises and, according to the invention, is also detected. The increased estimation error is detected if a greater remaining range (RRW>0 km) is displayed than what would actually be possible due to the currently estimated state of charge SOC if the basically predefined minimum cell voltage limit (for example, 2.8V) is to be not fallen below. According to the invention, the emergency mode is now activated by permitting the "Normal" drivability limit to be fallen below. This takes place by temporarily releasing a lower minimum cell voltage limit (for example, 2.1V, see also FIG. 4). Preferably, the cell voltage limit is temporarily reduced to such an extent that the remaining range that is actually achievable as a result corresponds to the displayed remaining range. Charging is carried out at a remaining range of 0 km, as the result of which the emergency mode is automatically switched off.

Due to this temporary and estimation error-dependent automatic emergency mode, the estimation reserve can be reduced and/or the lower charge state limit can be reduced. This is apparent in a comparison of the SOC thresholds in FIG. 5 with the SOC thresholds in FIG. 4.

The present invention is not limited to the exemplary embodiments shown. In particular, it is important to note that the description and the figures are to illustrate only the principle of the provided methods, devices, and systems.

The invention claimed is:

1. A device for increasing a range of a vehicle driven by an electric motor and a high-voltage battery, the device comprising:
an electronic control unit configured to:
estimate a remaining range of the high-voltage battery based on a state-of-charge of the high-voltage battery, wherein the remaining range is displayed on a display,
determine, during driving in a normal mode, that the remaining range results from an estimation error that over-estimates the remaining range, and
in response to determining that the remaining range results from the estimation error and without correcting the remaining range displayed, automatically switch from the normal mode to an emergency mode in which a cell voltage below a first cell voltage limit is useable by the electric motor,
wherein the cell voltage below the first cell voltage limit is not useable by the electric vehicle in the normal mode, and wherein the first cell voltage limit is associated with a lower state-of-charge limit at which the remaining range is displayed as a no-remaining-range indicator.

2. The device according to claim 1, wherein the cell voltage below the first cell voltage limit that is useable, in the emergency mode, by the electric motor is sufficient to achieve the remaining range displayed.

3. The device according to claim 1, wherein use of the cell voltage below the first cell voltage limit by the electric motor in the emergency mode is temporarily permitted up to a next charging process or up to a second cell voltage limit lower than the first cell voltage limit.

4. The device according to claim 1, wherein the emergency mode is predefined in state state-of-charge range directly below a defined estimation reserve.

5. The device according to claim 4, wherein the defined estimation reserve is predefined directly below the lower state-of-charge limit.

6. The device according to claim 1, wherein the emergency mode is suppressible when a defined condition is present.

7. The device according to claim 6, wherein one defined condition for suppressing the emergency mode is that the second cell voltage limit has been fallen below.

8. The device according to claim 6, wherein during driving in a suppressed emergency mode, the lower state-of-charge limit is set higher than for driving in the emergency mode.

9. The device according to claim 6, wherein during driving in a suppressed emergency mode, the state-of-charge range of the estimation reserve is greater than for driving in the emergency mode.

10. A method for increasing a range of a vehicle driven by an electric motor and a high-voltage battery, the method comprising:
    estimating, by an electronic control unit, a remaining range of the high-voltage battery based on a state-of-charge of the high-voltage battery, wherein the remaining range is displayed on a display;
    determining, during driving in a normal mode, that the remaining range results from an estimation error that over-estimates the remaining range; and
    in response to determining that the remaining range results from the estimation error and without correcting the remaining range displayed, automatically switching from the normal mode to an emergency mode in which a cell voltage below a first cell voltage limit is useable by the electric motor,
    wherein the cell voltage below the first cell voltage limit is not useable by the electric vehicle in the normal mode, and wherein the first cell voltage limit is associated with a lower state-of-charge limit at which the remaining range is displayed as a no-remaining-range indicator.

11. The method according to claim 10, wherein the cell voltage is lowered below the first cell voltage limit that is useable, in the emergency mode, by the electric motor is sufficient to achieve the such that the displayed remaining range is actually achievable displayed.

12. The method according to claim 10, wherein use of the cell voltage below the first cell voltage limit by the electric motor in the emergency mode is temporarily permitted up to a next charging process or up to a second cell voltage limit lower than the first cell voltage limit.

13. The method according to claim 10, wherein the emergency mode is predefined in a state-of-charge range directly below a defined estimation reserve.

14. The method according to claim 13, wherein the defined estimation reserve is predefined directly below the lower state-of-charge limit.

15. The method according to claim 10, wherein the emergency mode is suppressible when a defined condition is present.

16. The method according to claim 15, wherein one defined condition for suppressing the emergency mode is that the second cell voltage limit has been fallen below.

17. The method according to claim 15, wherein during driving in a suppressed emergency mode, the lower state-of-charge limit is set higher than for driving in the emergency mode.

18. The method according to claim 15, wherein during driving in a suppressed emergency mode, the state-of-charge range of the estimation reserve is greater than for driving in the emergency mode.

* * * * *